C. E. MILLER.
Grain-Drill.
No. 37,354.
Patented Jan. 6. 1863.
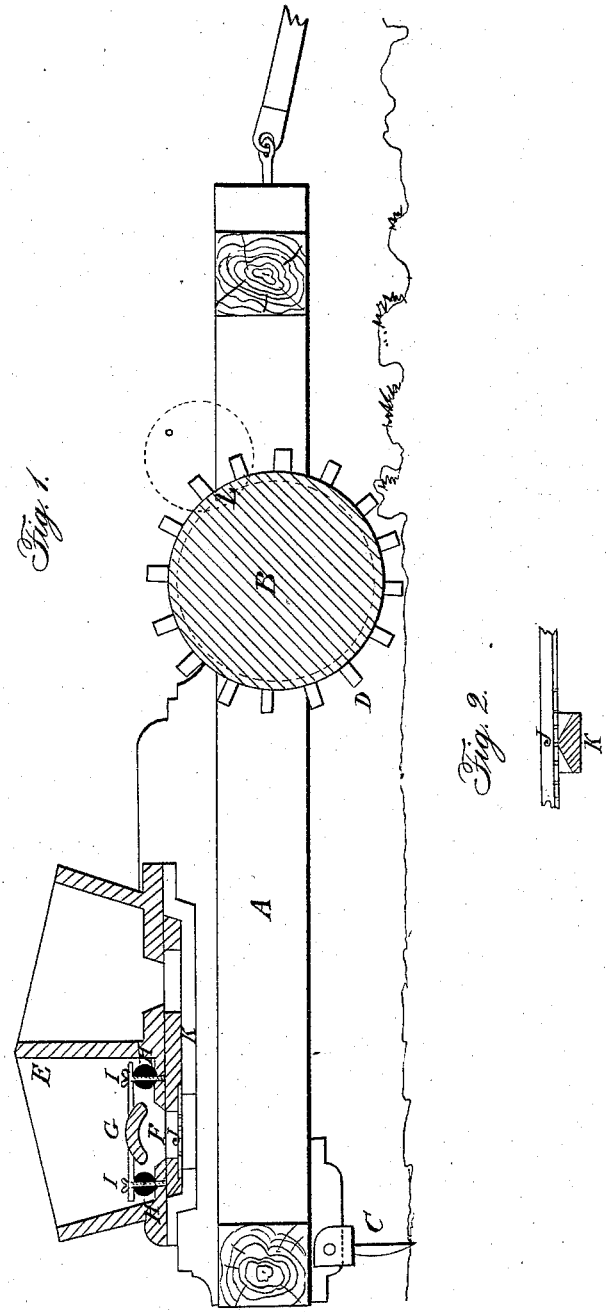
Witnesses:
James H. Gridley
Adams Knight
Inventor:
C. E. Miller
per Knight Bros Attys

UNITED STATES PATENT OFFICE.

CHARLES E. MILLER, OF AMELIA, OHIO.

IMPROVEMENT IN SEEDERS.

Specification forming part of Letters Patent No. 37,354, dated January 6, 1863.

*To all whom it may concern:*

Be it known that I, CHARLES E. MILLER, of Amelia, Clermont county, Ohio, have invented a new and useful Combined Clod-Crusher, Harrow, and Seed-Planter; and I do hereby declare the following to be a full, clear, and exact description thereof, reference being had to the annexed drawings, making part of this specification.

Figure 1 is a longitudinal section of the implement. Fig. 2 shows by transverse section a portion of the seeding mechanism.

A is a stout frame, supported in front on a clod-crushing roller, B, and in rear by a harrow, C. The periphery of the roller B is armed with stout flat-ended pins, which project radially and are distributed equably over its surface. The outer ends of these pins must present each one a sufficient breadth of surface to crush, rather than merely penetrate the clods. The harrow C is butt-hinged to the frame, so as to fold upward when the implement is backed.

E is a hopper, having two or more compartments for different kinds of grain. The rear compartment of the hopper is for grass, and has a long slot, F, transverse of the machine, which is capable of being closed to a greater or less extent at the discretion of the husbandman by the concavo-convex valve or register G, held up by springs H, and adjusted downward by means of screws I.

J is a perforated slide, operated from the roller B by any customary gearing, L.

K is one of a series of equidistant staples, beveled upward to a narrow edge, where they support the slide.

Having thus described my invention, what I claim therein as new, and desire to secure by Letters Patent, is—

1. The seeding apparatus consisting of the hopper E, having a long transverse ventage, F, closable by the adjustable concavo-convex shield or register G, and supported by the beveled staples K, in combination with the spiked clod-crushing roller B, arranged and operating in the manner specified.

2. The described arrangement of clod-crusher B D, harrow C, and seeding apparatus E F G H I J K L, as and for the purpose set forth.

In testimony of which invention I hereunto set my hand.

C. E. MILLER.

Witnesses:
GEO. H. KNIGHT,
FRANK A. DIAL.